CONTROL CIRCUIT FOR MULTISTAGE CROSSPOINT NETWORK

Filed Nov. 1, 1966

2 Sheets-Sheet 1

CONTROL CIRCUIT FOR MULTISTAGE CROSSPOINT NETWORK

Filed Nov. 1, 1966 2 Sheets-Sheet 2

United States Patent Office 3,519,754
Patented July 7, 1970

3,519,754

CONTROL CIRCUIT FOR MULTISTAGE CROSSPOINT NETWORK

Heinz Schlüter, Kornwestheim, Germany, assignor to International Standard Electric Corporation, New York, N.Y., a corporation of Delaware Filed Nov. 1, 1966, Ser. No. 591,188
Claims priority, application Germany, Nov. 17, 1965, St 24,656
Int. Cl. H04q 3/00
U.S. Cl. 179—18 7 Claims

ABSTRACT OF THE DISCLOSURE

A switching arrangement is provided for establishing connections through a plurality of switching stages. Circuits at each stage are provided for coupling the winding of each crosspoint relay via a make-contact between seizing wires and via the make-contact of an associated switching multiple marking relay.

The invention relates to a control circuit for a multistage regular network for finding a desired connecting path through the network by selecting a switch multiple in each switching stage.

A regular multistage crosspoint network is a crosspoint arrangement in which only one link is provided between two switching multiples of adjacent switching stages. By selecting a switching multiple in each switching stage, a connecting path is automatically determined from the input to the output of the crosspoint arrangement. However, the crosspoint elements or crosspoint relays are not determined or actuated in the individual switching multiples. Since each link is connected to a column or to a row of a switching multiple, a through-connection is made when that crosspoint relay is energized to connect the link terminating at the selected switching multiples of the preceding and the following switching stages.

In telecommunication, particularly telephone exchange systems with centrally controlled crosspoint arrangements, it is desired to establish a connection as quickly as possible. Among other things this will keep the seizing periods of the central control elements as short as possible, thus minimizing the holding time and, therefore, the amount of central controls that are required. The shortest through-connecting time is obtained when all switching stages are simultaneous through-connection.

There are various known circuit arrangements for enabling a simultaneous through-connection of all relays. Thus, the individual crosspoint relays are actuated, as in a co-ordinate system, which requires a considerable expenditure on marking lines and facilities. Moreover, information regarding the switching multiples which are selected in the adjacent switching stages, must be transmitted to the control facilities of the participating switching stages in order to enable the crosspoint actuation. Moreover, crosspoint relays have only one winding. Therefore, the holding circuit for the crosspoint relays belonging to a connecting path pass through the operating windings. To provide this holding circuit, the winding of each crosspoint relay is series-connected through a separate make-contact inserted into the seizing wire. After all crosspoint relays have been operated and a through-connecting path has been established, the relays are held energized by the seizing wires, through-connected by the closed make-contacts, of the respective links, series-connected across all switching stages.

An object of the invention is to reduce the expenditure of control circuits for the crosspoint relays while maintaining the advantage of a simultaneous through-connection in all switching stages.

According to the invention, the circuit arrangement is characterized in this that the winding of each crosspoint relay of a switching multiple is inserted between the seizing wires of the links crossing each other at the respective crosspoint. This path, including the winding, is via a make-contact of the switching multiple marking relay, associated to this switching multiple. For through-connecting a path, the seizing wires of an input and of an output of the crosspoint arrangement can be connected to different crosspoint potentials. In the circuit arrangement, the expenditure required for a co-ordinate like actuation of the individual crosspoint relays is avoided. A common responding circuit is formed for all crosspoint relays which are to be actuated, thus making use of the possibilities rendered by a regular crosspoint arrangement.

In a further embodiment of the invention, in order to maintain the advantage of a crosspoint relay with only one winding, the winding of each crosspoint relay in a switching multiple is inserted (via a make-contact) between the seizing wires of the links crossing each other at the respective crosspoint. The make-contacts belonging to a column are bridged by a common make-contact of the associated switching multiple marking relay.

In multistage crosspoint arrangements, the seizing relays are inserted into the seizing wires of the links. For these relays, a control circuit then exists in a through-connected path and the operated seizing relays indicate the busy condition of the associated links in a route searching network. The seizing relays of the links in an anticipated path are located in a holding circuit extending across all switching stages via the make-contacts of the excited crosspoint relays. Consequently, the seizing relays respond only after a path has been through-connected in the holding circuit.

To guarantee a busy indication of the seized links after a through-connection, a further embodiment of the invention provides a seizing relay which is inserted into each seizing wire. This relay is series-connected with the make-contact of a crosspoint relay. The resulting series-connection is bridged by a series-connection formed by the make-contact of the associated switching multiple marking relay and a break-contact of the seizing relays.

Thus, the seizing relays are operated only when the holding circuit is established after the through-connection of a path. This arrangement offers certain advantages. For testing purposes, the individual timely sequential conditions (e.g. marking, through-connecting, busy indicating the route searching network) are recognized separately. The break-contact of the seizing relay simultaneously causes the separation of the seizing wire of a busy link and the marking contact. In a further embodiment of the invention, a resistor is inserted into the series-connection bridging a make-contact of a crosspoint relay and a seizing relay, said resistor having a magnitude such that, the seizing relay receives marginal current after the make-contact has closed.

In a further embodiment of the invention a resistor is inserted into the series-connection, bridging a make-contact of a crosspoint relay and a seizing relay, which resistor receives marginal current after the make-contact has closed.

This offers the advantage that the seizing relay is pre-excited with marginal current during the period between the through-connection and the closing of the holding circuit (disconnection of the switching multiple marking relay). This reduces a heavy current resulting from the inductivity of the seizing relay when the holding circuit closes.

The above mentioned and other features and objects of this invention and the manner of obtaining them will become more apparent, and the invention itself will be best understood by reference to the following description of an embodiment of the invention taken in conjunction with the accompanying drawings, in which.

Figure 1:
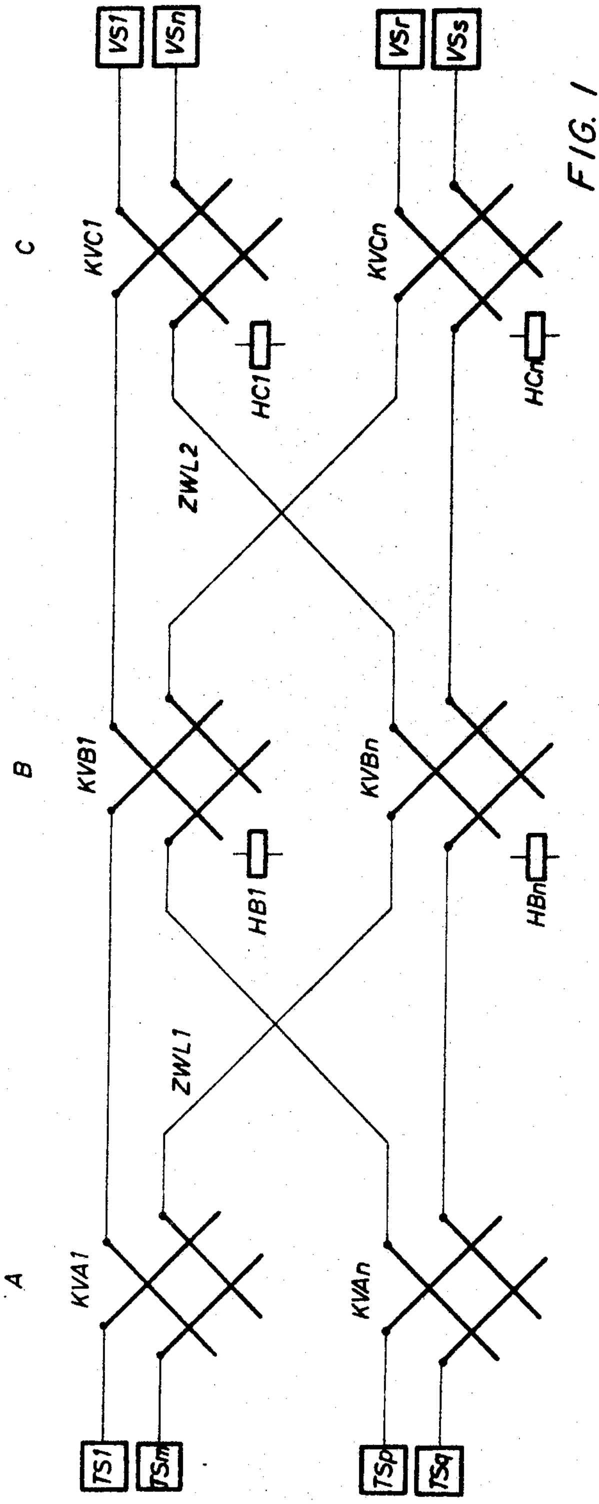
FIG. 1 shows a schematic representation of a cross-point arrangement in which the invention may be used.

FIG. 1 shows a multistage crosspoint arrangement. Only the seizing wires of the links are shown. The speech path conductors (not shown) run parallel to these seizing wires.

The crosspoint arrangement comprises three switching stages A, B and C. In each switching stage only two switching multiples are shown: in stage A the switching multiples KVA1 and KVA*n*, in stage B the switching multiples KVB1 and KVB*n*, and in stage C the switch multiples KVC1 and KVC*n*. The multiples are arranged so that only one link exists between switching multiples of adjacent switching stages. The subscriber circuits TS1, TS*n* . . . TS*p*, TS*q* are connected on the left side of the cross-point arrangement. The junction sets VS1, VS*n* . . . VS*r*, VS*s* are connected on the right side. A separate switching multiple marking relay is associated with each switching multiple of the stages BC, exemplary relays of which are here shown as HB1, HB*n*, HC1, HC*n*.

To establish a connection from a subscriber circuit (e.g. TS1) to an available junction set, a path is selected by means of a route searching method, of any well known type. To this end, a switching multiple is selected in each of the switching stages B and C. The switching multiple marking relays associated with the selected switching multiples are energized. No selection is required in the first switching stage A because the location of the subscriber circuit TS1 defines the switching multiple through which the connection must be led. Therefore, no switching multiple marking relays are associated with the switching multiples of the stage A. In switching stage C a selection must be made, however, because different junction sets may be available which can be reached by the subscriber circuit TS1. One junction set is selected and said selected junction set can be connected to one of the switching multiples of stage C.

It is assumed that the selected connection leads from the subscriber circuit TS1 to the junction set VS1 via the switching multiples KVA1, KVB*n* and KVC1. The switching multiple marking relays HB*n* and HC1 are then energized. As always, only one link exists between the switching multiples KVA1 and KVB*n* as well as between KVB*n* and KVC1; therefore, the connecting path is determined. To through-connect this path, three cross-point relays must be energized. The first relay connects the subscriber circuit TS1 with the link ZWL1. The second relay connects the link ZWL1 with the link ZWL2. The third relay connects the link ZWL2 with the connecting line of the junction set VS1.

Figure 2:
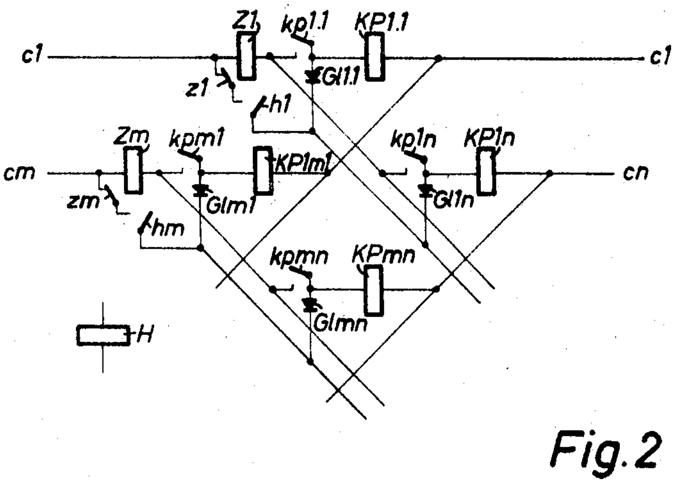
FIG. 2 shows a switching multiple.

Before the through-connection is explained in detail with the aid of FIG. 3, the arrangement of a switching multiple as shown in FIG. 2 will be explained concisely.

FIG. 2 shows only the seizing wires *c*1 . . . *cm* and *c*1 . . . *cn* of the links, connected to the columns and rows of the switching multiple. At the crosspoints of the columns and rows are arranged the windings of the cross-point relays KP11 . . . KP*mn* in series with the make-contacts *kp*11 . . . *kpmn*. Seizing relays Z1 . . . Z*m* are inserted into the seizing wires of the links connected to the columns. If the switching multiple marking relay H, associated with this switching multiple, is caused to respond it closes its contact *h*1 . . . *hm*. The seizing relay Z1 and the series-connected make contacts *kp*11 . . . *kp*1*n* are bridged through rectifiers Gl11 . . . Gl1*n* via closed contact *h*1 and the series-connected break-contact *z*1 of the seizing relay Z1. A similar circuit is provided for each crosspoint. Each of the contacts of the switching multiple marking relay H, associated individually with a column, has the same effect with regard to the other columns and their seizing relays. The seizing relays Z*m*, and consequently the series-connected make-contacts *kpm*1 . . . *kpmn*, are bridged via contacts *hm* and the rectifiers Gl*m*1 . . . Gl*mn*.

The connection (FIG. 3) passes from telephone station TS1 to the junction set VS1 via the switching multiples KVA1, KVB*n* and KVC1. The crosspoint relays KP are arranged in series with their make-contacts *kp* at the crosspoints of the lines to be through-connected. As explained with the aid of FIG. 2, the series connection of seizing relay Z and the make-contact *kp* are bridged by the series connection of break-contact *z*, make-contact *h* and decoupling rectifier G1. In switching stage A this bridging circuit is not required. It is shown in switching stages B and C.

For through-connecting a line, the output stage marker EM applies the potential —U1 to the connecting point between the winding of the crosspoint relay KPA and its make-contact *kpa*. Contact *k* in the junction set VS1 closes and applies potential +U to the seizing wire of the line of junction set VS1. A starting circuit exists via the conductive rectifier G1 and via the seizing wires *c*1 and *c*2 when the contacts *h* of the switching multiple marking relays are closed at the associated switching multiples KVB*n* and KVC1. The starting circuit operates the cross-point relays KPA, KPB and KPC. Thus, the contacts *kpa*, *kpb* and *kpc* close and prepare a series-type holding circuit for all three crosspoint relays.

After through-connection, the switching marking relays are de-energized. The contacts *h* open and remove the short circuit for the seizing relay Z. Therefore, these relays also respond. To prevent unintended double connections, the break-contacts Z open so that seized links will not furnish a wrong reference potential when other paths are through-connecting. In the junction set VS1, contact *d* is closed and contact *k* opens. The output stage marker EM is switched off. The crosspoint relays are held energized in series with the seizing relay Z and the relay T, between the potentials ground at contacts *d* and —U2 in station TS1.

To prevent existing connections from being influenced when through-connecting other routes, the potentials must be selected so that the decoupling rectifiers do not become non-conductive and thereby couple the seizing wires. To this end, the potential (+U) which is applied in the junction set VS1 with reference to the poles of the rectifiers G1 shown in the figures must be more positive than the holding potential (ground). The through-connecting potential (—U1) applied on the subscriber end must be more positive than the holding potential (—U2). This condition would also be met, if ground potential is applied as a through-connecting potential on the subscriber end. Suitably, one should select this potential —U1 as negative as possible with regard to a maximum high responding current for the crosspoint relays.

When the connections are released and if the ground potential is disconnected in the junction set and holding potential—U2 is applied from the subscriber circuit, no erroneous connections are established by the release of existing connections.

Figure 3:
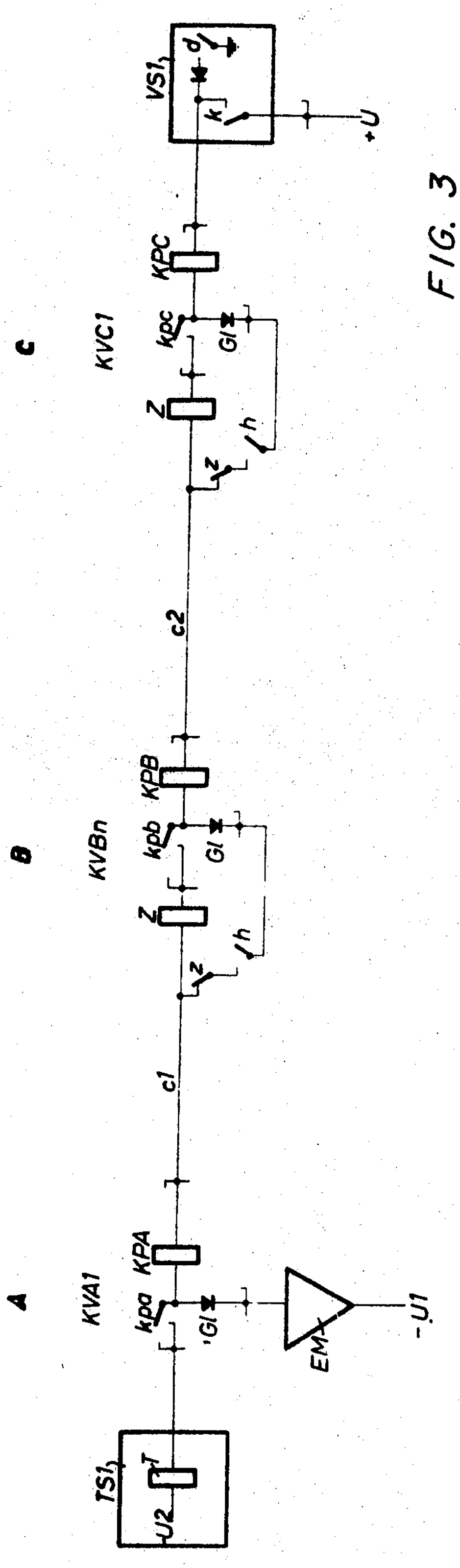
FIG. 3 shows the through-connecting and holding circuit for a connection.
Figure 4:
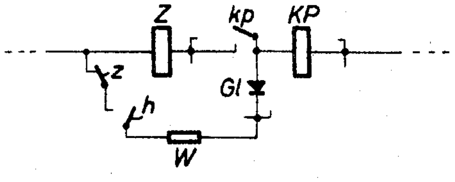
FIG. 4 shows a variant of the circuits according to FIG. 3.

FIG. 4 shows a portion of FIG. 3 whereby a resistor W is series-connected with the contacts *z* and *h*. The value of this resistor is such that, after response of the crosspoint relay KP, the seizing relay Z receives marginal current through contact *kp*. The seizing relay Z is thus pre-excited to reduce the heavy current caused by the inductivity of this relay after contact *h* in the holding circuit has opened.

While the principles of the invention have been described above in connection with specific apparatus and applications, it is to be understood that this description is made only by way of example and not as a limitation on the scope of the invention.

I claim:

1. A control circuit arrangement for a multistage crosspoint network of coordinate switching multiples, each of said coordinate multiples including a connection to one end of a seizing wire for determining a path to a second multiple corresponding to a request for establishing a connection, a plurality of switching multiple marking relays associated with these switching multiples, a crosspoint relay at each crosspoint as determined by the intersection of seizing wires in a multiple, a winding for each crosspoint relay energized via a make-contact of the switching multiple marking relay associated with this switching multiple, means for through-connecting a path by connecting positive and negative potential sources to the seizing wires of an input and of an output of the crosspoint network, and circuit means for coupling the winding of each crosspoint relay via a make-contact between the seizing wires of the links crossing at the respective crosspoint, said means for through-connecting including means for bridging each of these make-contacts between seizing wires via the make-contact of the associated switching multiple marking relay.

2. The circuit arrangement according to claim 1 and a seizing relay inserted into each seizing wire series-connected with a make-contact of a crosspoint relay, said bridging means bridging the thus formed series connection by a series-connection formed by the make-contact of the associated switching multiple marking relay and a break-contact of the seizing relay.

3. The circuit arrangement according to claim 2 and a resistor (W) inserted into the series-connection bridging a make-contact of a crosspoint relay and a seizing relay, said resistor having a value such that the seizing relay receives marginal current after the make-contact has closed.

4. The circuit arrangement according to claim 1 characterized in this that the branch containing the make-contact of a crosspoint multiple marking relay is coupled in common with all make-contacts of the crosspoint relays of a column crosspoint multiple, and the individual make-contacts of the crosspoint relay are connected in parallel to said branch via an individual decoupling rectifier.

5. The circuit arrangement according to claim 1 and means for applying through-connecting potentials to the input and output end of a connecting route to establish a connection via the make-contacts of the individual switching multiple marking relays and a series-connection of said seizing wires, and means for applying holding potentials on the input and on the output ends of the series-connection of the seizing wires of the route, passing via the make-contacts of the energized crosspoint relays.

6. The circuit arrangement according to claim 5, characterized in this that each of the two through-connecting potentials applied to the input and to the output, is more positive than the holding potentials, applied to the input and output respectively, and that decoupling rectifiers are coupled to the seizing wires, said decoupling rectifiers being poled in such a way that they cause decoupling between the seizing wires to which are applied holding potentials and through-connecting potentials.

7. The circuit arrangement according to claim 5 and means for preventing the removing of the holding potentials for a through-connected path during the through-connection of another path.

References Cited

UNITED STATES PATENTS

| | | | |
|---|---|---|---|
| 3,244,812 | 4/1966 | Nitsch et al. | 179—18 |
| 3,294,920 | 12/1966 | De Kroes et al. | 179—18 |
| 3,347,994 | 10/1967 | Schluter | 179—18 |
| 3,349,187 | 10/1967 | Bray et al. | 179—18 |

KATHLEEN H. CLAFFY, Primary Examiner

W. A. HELVESTINE, Assistant Examiner